Figure 1:
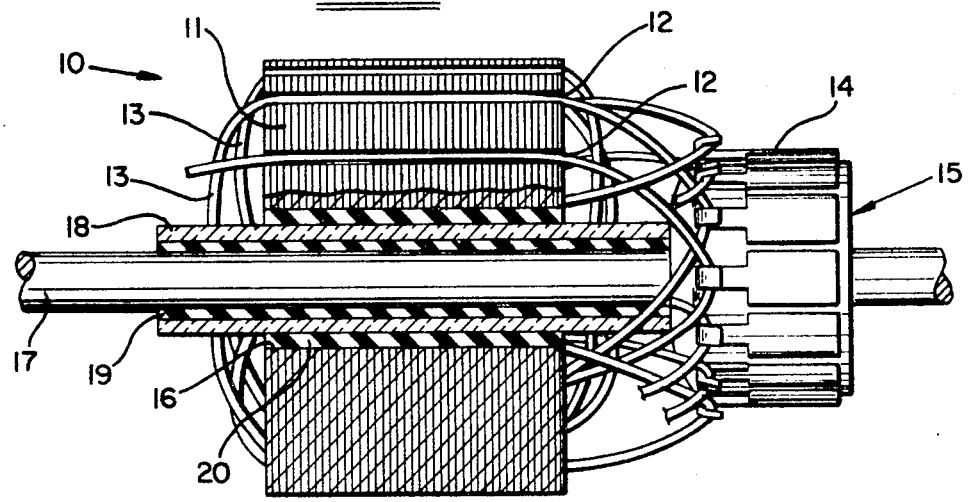

United States Patent [19]

Bednarski

[11] 3,737,988

[45] June 12, 1973

[54] METHOD OF BONDING ARMATURE SUB-ASSEMBLIES

[75] Inventor: Thaddeus E. Bednarski, Timonium, Md.

[73] Assignee: The Black and Decker Manufacturing Company, Towson, Md.

[22] Filed: Aug. 4, 1972

[21] Appl. No.: 278,052

Related U.S. Application Data

[60] Continuation-in-part of Ser. No. 147,141, May 26, 1971, which is a division of Ser. No. 878,825, Nov. 21, 1969, Pat. No. 3,639,789.

[52] U.S. Cl. ............ 29/596, 29/597, 29/598, 156/294, 264/262, 310/43, 310/45, 310/261
[51] Int. Cl. .................................. H02k 15/00
[58] Field of Search ............ 29/596, 597, 598, 29/609; 156/293, 294, 295; 264/262, 272; 310/42, 43, 45, 217, 261

[56] References Cited
UNITED STATES PATENTS

| | | | |
|---|---|---|---|
| 2,751,525 | 6/1956 | Hekelaar | 336/233 X |
| 3,658,624 | 4/1972 | Lees | 156/294 X |
| 3,204,134 | 8/1965 | Schneider | 310/45 X |
| 3,673,040 | 6/1972 | Hill | 156/294 |
| 2,351,329 | 6/1944 | Gerstenmaier | 264/262 X |
| 3,477,125 | 11/1969 | Schwartz | 29/596 |
| 3,387,839 | 6/1968 | Miller et al. | 156/294 X |
| 2,818,517 | 12/1957 | Loosjes | 310/156 |
| 2,689,755 | 9/1954 | Krotz | 264/262 X |
| 2,444,997 | 7/1948 | Lovesy | 264/262 |

FOREIGN PATENTS OR APPLICATIONS 151,024   8/1955   Sweden

*Primary Examiner*—Charles W. Lanham
*Assistant Examiner*—Carl E. Hall
*Attorney*—Leonard Bloom, Joseph R. Slotnik and Edward D. Murphy

[57] ABSTRACT

A method of manufacturing an armature of the type including a sleeve of insulating material bonded in place between the armature shaft and the armature laminations is described. The method comprises positioning the laminations, the sleeve and the shaft in appropriate relative positions and providing an anaerobic bonding material between the sleeve and the shaft, and between the sleeve and the laminations.

2 Claims, 2 Drawing Figures

PATENTED JUN 12 1973 3,737,988

METHOD OF BONDING ARMATURE SUB-ASSEMBLIES

This application is a continuation-in-part of my copending application Ser. No. 147,141, filed May 26, 1971 and assigned to the assignee of this invention, which is itself a division of application Ser. No. 878,825, filed Nov. 21, 1969, now U.S. Pat. No. 3,639,789, issued Feb. 1, 1972.

This invention relates to double insulated armature shafts and is particularly directed to a method of construction which is both improved and less expensive.

One present method of providing insulation between the shaft of an electric motor and the stack of laminations in which the armature windings are placed is based on the injection and molding in place of a material which performs both the functions of bonding the laminations to the shaft and of insulating the laminations from the shaft. It is difficult to obtain materials which adequately meet all of the requirements of this process without excessive cost. An even more significant expense of this process is the fact that the material must be molded in place within a highly complex press which holds the various elements in the proper location and applies suitable heat and pressure so that an injected resin is molded in place. Suitable presses for performing this operation are extremely expensive; in addition, only a few units can be processed at a time so that, for mass production, large numbers of the presses are required with a consequent increase in the capital investment required.

An alternative to this method is that of molding a sleeve around the armature shaft, grinding it to an appropriate size and pressing it into the center bore in the stack of laminations. While this process decreases the expense of the press required for molding the sleeve, the tolerance requirements of the pressing operation are extremely high. These requirements apply to the size of the center bore, the size of the molded sleeve and the relative position of the sleeve and the stack as the pressing is performed. Tolerance limitations on these steps are usually on the order of 0.001 inch or even less. Mass production tooling which can maintain these tolerances over extended periods of quality production is extremely expensive. It is a primary purpose of this invention to provide a new armature construction which avoids these difficulties and the consequent expense while at the same time providing improved results.

It is accordingly an object of this invention to provide a novel method of making an improved insulated armature.

Another object of this invention is the provision of a new and improved method of constructing armatures which is less complicated and less expensive than previous methods.

Further objects and advantages of this invention will become apparent as the description and illustration thereof ensue.

Briefly, in accord with this invention, a method of manufacturing an armature for an electric motor is described. The armature includes a rotor comprising a stack of laminations which have a plurality of windings and a central bore, a shaft located within the bore for providing a power output, an insulating sleeve disposed between the rotor and the shaft and adhesive layers respectively affixing the rotor to the sleeve and the sleeve to the shaft. In a particular embodiment, the sleeve comprises a paper cylinder. The method of this invention includes the steps of positioning the sleeve and the shaft and applying an anaerobic liquid adhesive therebetween and allowing the adhesive to cure, and positioning the sleeve and the laminations, applying an anaerobic liquid adhesive therebetween, and allowing the adhesive to cure.

Figure 2:
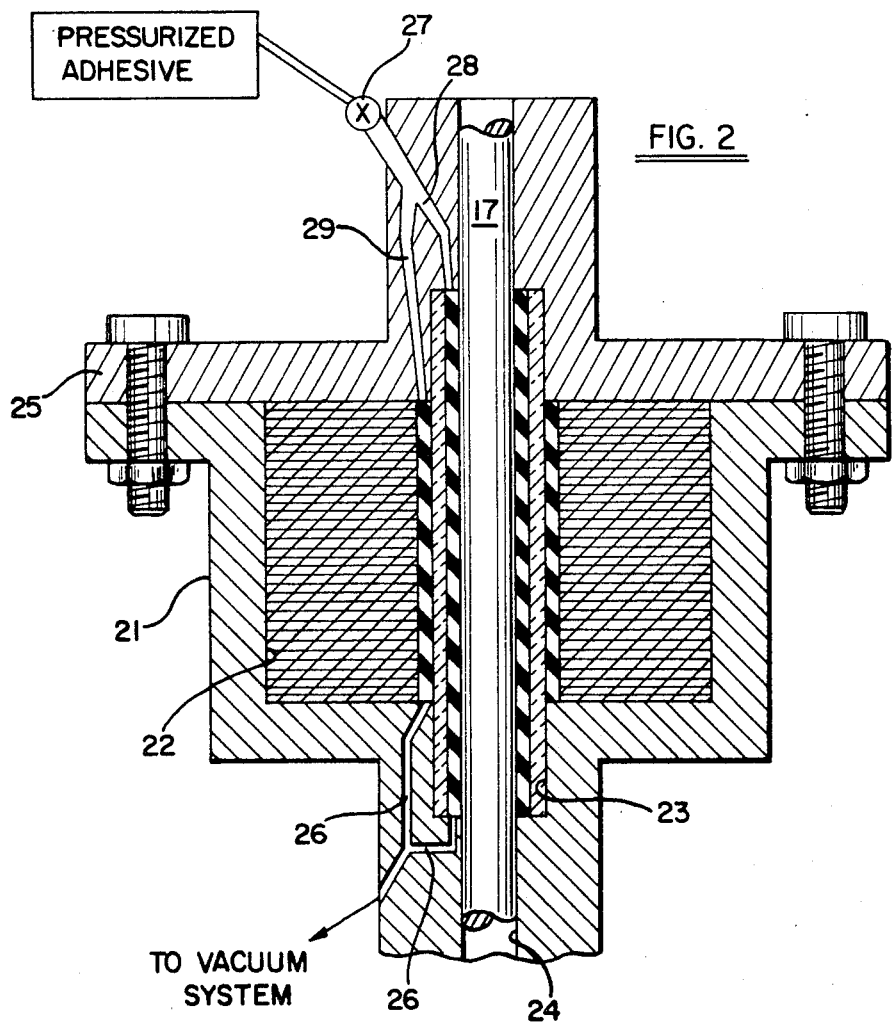

This invention will best be understood from a consideration of the following description and accompanying drawings in which:

FIG. 1 is a plan view, partially in cross-section, of an armature constructed in accord with the present invention; and FIG. 2 is a cross sectional view of apparatus for performing the method in accord with this invention.

In FIG. 1, an armature 10 is illustrated which comprises a stack of laminations 11 having a plurality of slots 12 in which coils 13 of insulated wire are wound in accord with conventional practice. Each coil is attached to a conductive bar 14 of a commutator 15, the particular armature illustrated being designed for use in a universal motor.

The laminations 11 are provided with a central bore 16 in which is disposed a shaft 17. In use, an electromagnetic torque applied to the windings causes the rotor to rotate and a power output is derived from one end of the shaft 17 which is located within the bore 16.

The shaft is insulated from the rotor stack by means of a sleeve 18 of insulating material which surrounds the shaft and extends under the entire length of the stack. The sleeve is affixed to the shaft 17 and to the stack 11 by means of adhesive layers 19 and 20. The sleeve may comprise an insulator such as glass or paper.

A particularly significant advantage of this invention is derived from the method of assembly. Specifically, as previously noted, other methods require very complex and expensive equipment, either for holding the parts in place during molding or for meeting the tolerance requirements of a pressing operation. The armature of the present invention can be constructed in simple, inexpensive apparatus which can readily be adapted to the manufacture of large quantities. For example, FIG. 2 illustrates schematically a suitable fixture for the performance of the method of this invention. The supporting structure 21 includes respective openings 22, 23 and 24 for receiving the shaft, sleeve and laminations. A cover member 25 is clamped in place to secure the laminations and to hold the shaft and sleeve in alignment. Vacuum lines 26 are preferably used to prevent the entrapping of air at the base of the unit; appropriate means may of course be provided to seal off these openings when the adhesive is introduced.

The adhesive is supplied from a reservoir of liquid adhesive. A valve 27 supplies the adhesive to nozzles 28 and 29 which respectively inject the liquid adhesive into the spaces between the laminations and the sleeve and between the sleeve and the shaft. After the adhesive is introduced, curing may be performed either by time alone or by the application of heat to increase the speed of curing.

Even if a source of heat is provided to assist in curing the adhesive, the fixture and tooling for performing this method are much simpler than that required by previous methods. For example, the tolerance requirements for the relative size and position of the three elements need only be maintained within several thousandths of an inch. Although this is still a relatively small space, the difference in the tooling required to maintain this tolerance as compared to that of less than 0.001 inch may reduce the cost by a factor of one-third to one-fifth. A similar comparison also applies when considering this equipment as compared to that required for performing molding of a material which must function both as an adhesive and as an insulator.

As previously noted, the subject invention not only enables the cost of manufacture to be substantially reduced, but it also provides a more effective insulative barrier than previous method. Specifically, if the single layer of previous constructions is provided, a breakdown in that material which occurs due to a particular cause is frequently of a type which can readily propogate across the width of the material. This is due to the fact that the cause of the initial breakdown may continue to affect the same material in the same way. In a constriction according to the present invention, however, this possibility is avoided because there are two different material arranged in three layers between the shaft and the stack. Thus, a cause of failure in one of the layers is unlikely to have any effect at all on the adjacent layer of the other material. For example, if breakdown of the polymeric adhesive material occurs due to age in either of the adhesive layers, it may propogate rapidly across the width of that layer but it will not propogate through the sleeve since the sleeve is chemically different and is not affected by the same conditions. On the other hand, if a rupture occurs in the sleeve, it will not affect the adhesive layers on either side since the adhesive is a relatively resilient material and will withstand the rupturing stress. Thus, the insulation provided by the illustrated construction is substantially more effective than that provided by previous constructions.

In one embodiment, the insulating sleeve is glass and the adhesive material is a room temperature vulcanizing rubber. This particular embodiment is of interest due to the fact that the dielectric strength of glass is so high that the insulation requirements such as, for example, those of Underwriters' Laboratories, Inc., are more than fulfilled by the glass cylinder itself and any insulating effect provided by the rubber is, in effect, a bonus. A potential difficulty with this embodiment is the possibility that the glass may break. In accord with this invention, this is overcome by providing a sufficiently thick and sufficiently resilient layer of adhesive on each side of the sleeve so that any stresses introduced between the shaft and the stack which might tend to fracture the glass are taken up by the adhesive. For example, these stresses may be either thermal, due to a difference in the amount of expansion under heat of the glass cylinder as compared to the metal stack and shaft, or mechanical, due to the twisting moment between the rotor stack and the shaft.

A preferred embodiment of this invention includes the use of a paper tube made up of several layers to provide good physical and dielectric strength between the shaft and the lamination stack. It has also been determined that, while a variety of adhesives such as room temperature vulcanizing rubber and epoxy resins may be used, the method of this invention may be substantially improved by providing an anaerobic adhesive, for example a polyacrylate resin of the type described and claimed in U. S. Pat. No. 2,895,950. Later developments of these materials are available from the Loctite Corporation under the designations RC-40 and RC-75.

More specifically, it has been found that the necessary properties of this armature construction may be substantially improved by making use, in the process of manufacture, of an anaerobic adhesive which hardens in the absence of air. This method is particularly suited to the use of this material since both the final construction and the method then are improved by using a strong, tight, non-porous tube and a tightly compressed stack. The elimination of air spaces as required by this adhesive corresponds to the desirability of a tightly constructed, integral armature sub-assembly.

In terms of the method of manufacture, the preferred process includes the steps of providing the shaft, the sleeve and the stack; providing an anaerobic adhesive respectively between the shaft and the sleeve, and between the sleeve and the stack; and curing the adhesive into a hardened state to provide a strong, integral structure.

Of course, other insulative materials than glass or paper may be selected if desired. It is also noted that, to meet specific requirements, various modifications in the properties of these materials may be desired. For example, by providing a certain amount of resilience in the adhesive material, a certain amount of relative rotation may be permitted between the stack and the shaft under locked-rotor condition. This may be used to relieve strain which would otherwise break the gears in the output of the tool or other device in which the motor is used.

Regardless of the material selected, it is preferred that the sleeve in the construction of this invention be a continuous cylindrical body. While it is possible to provide multiple elements which, when placed together approximate a cylinder, this introduces difficulty in aligning the pieces and therefore increases the cost and complexity of manufacture. In addition, the adhesive may not adequately fill the interface between the pieces and, even if it does, it permits the possibility of propogation of a fault through one material, thus defeating a particularly desirable feature of this invention.

While several embodiments of this invention have been shown and described, it will be apparent to those skilled in the art that many changes and modifications may be made from the specific illustrations without departing from the spirit of this invention in its broader aspects as defined by the appended claims.

I claim,

1. The method of producing a double-insulated armature for an electric motor, comprising the steps of:

providing an armature shaft, and providing a stack of armature laminations having a bore and further having a plurality of axially-extending circumferentially-spaced winding slots, further providing a hollow cylindrical insulating sleeve, the sleeve having an axial length which is greater than the length of the stack of laminations, and further having a radial wall thickness which is substantially less than the diameter of the armature shaft;

holding the shaft, sleeve, and stack in concentric relationship with respect to each other, whereby the sleeve is disposed radially between the shaft and the bore in the stack with respective radial clearances therebetween, and whereby the sleeve extends axially beyond the ends of the stack;

introducing a first curable anaerobic adhesive between the shaft and sleeve while the shaft and sleeve are in said concentric relationship and spreading the adhesive substantially along the entire axial length of the interior of the sleeve and beyond the ends of the stack to create a thin annular layer of adhesive between the shaft and sleeve, and curing the adhesive whereby the adhesive bonds the sleeve to the shaft, introducing a second curable anaerobic adhesive between the sleeve and the bore in the stack while the sleeve and the stack are in concentric relationship and spreading the adhesive substantially along that portion of the axial length of the exterior of the sleeve, as defined by the length of the stack, to create a thin annular layer of adhesive between the stack and the sleeve, and curing the adhesive whereby the adhesive bonds the stack to the sleeve, securing a commutator on the shaft, winding the armature by providing coils in the respective winding slots of the stack, and connecting the coils to respective portions of the commutator.

2. The method claimed in claim 1 wherein said step of introducing said second curable anaerobic adhesive is performed simultaneously with said introduction of said first curable anaerobic adhesive.

* * * * *